US008555200B2

(12) United States Patent
Hicks et al.

(10) Patent No.: US 8,555,200 B2
(45) Date of Patent: Oct. 8, 2013

(54) REPRESENTING EDITABLE ATTRIBUTES OF EMBEDDED CONTENT

(75) Inventors: Ryan Hicks, Seattle, WA (US); Alex Berg, Seattle, WA (US); Simon Gershey, Seattle, WA (US); Steve Apel, Seattle, WA (US)

(73) Assignee: wetpaint.com, inc., Seattle, WA (US)

( * ) Notice: Subject to any disclaimer, the term of this patent is extended or adjusted under 35 U.S.C. 154(b) by 752 days.

(21) Appl. No.: 11/842,786

(22) Filed: Aug. 21, 2007

(65) Prior Publication Data

US 2009/0055755 A1   Feb. 26, 2009

(51) Int. Cl.
*G06F 3/048* (2013.01)
*G06F 3/00* (2006.01)

(52) U.S. Cl.
USPC ............ 715/810; 715/754; 715/760; 715/758

(58) Field of Classification Search
USPC .................. 715/760, 764, 810, 800
See application file for complete search history.

(56) References Cited

U.S. PATENT DOCUMENTS

| | | | |
|---|---|---|---|
| 5,845,299 A * | 12/1998 | Arora et al. ................... | 715/209 |
| 6,601,057 B1 * | 7/2003 | Underwood et al. ......... | 715/207 |
| 6,745,238 B1 * | 6/2004 | Giljum et al. ................. | 709/219 |
| 6,950,991 B2 | 9/2005 | Bloomfield et al. | |
| 7,000,184 B2 | 2/2006 | Matveyenko et al. | |
| 7,152,207 B1 * | 12/2006 | Underwood et al. ......... | 715/207 |
| 7,191,405 B1 * | 3/2007 | Jaramillo ...................... | 715/763 |
| 7,340,673 B2 * | 3/2008 | Malone ......................... | 715/255 |
| 7,359,977 B2 | 4/2008 | Lewis | |
| 7,500,182 B2 | 3/2009 | Kelly | |
| 7,500,183 B2 | 3/2009 | Kelly | |
| 7,523,403 B2 * | 4/2009 | Karatal et al. ................ | 715/762 |
| 7,536,641 B2 * | 5/2009 | Rosenstein et al. ........... | 715/234 |
| 7,624,342 B2 | 11/2009 | Matveyenko et al. | |
| 7,676,505 B2 * | 3/2010 | Chess et al. ............ | 707/999.203 |
| 7,703,004 B2 * | 4/2010 | Bier ............................. | 715/234 |
| 7,716,352 B2 * | 5/2010 | Leetaru et al. ................ | 709/229 |
| 7,770,122 B1 * | 8/2010 | Shaik ............................ | 715/744 |
| 7,823,057 B1 * | 10/2010 | Schultz et al. ................ | 715/229 |
| 2002/0069204 A1 | 6/2002 | Kahn et al. | |
| 2002/0073125 A1 * | 6/2002 | Bier ............................. | 707/530 |
| 2002/0095435 A1 * | 7/2002 | Graham ........................ | 707/201 |
| 2004/0044966 A1 * | 3/2004 | Malone ........................ | 715/530 |
| 2004/0172459 A1 | 9/2004 | Schwalm et al. | |
| 2004/0217985 A9 * | 11/2004 | Ries et al. ..................... | 345/740 |
| 2006/0200751 A1 * | 9/2006 | Underwood et al. ...... | 715/501.1 |
| 2006/0212803 A1 | 9/2006 | Arokiaswamy | |
| 2006/0224697 A1 | 10/2006 | Norris | |
| 2007/0055755 A1 * | 3/2007 | Sasnett et al. ................ | 709/223 |

(Continued)

OTHER PUBLICATIONS

Steven Holzner, Inside Javascript, Aug. 28, 2002, New Riders, Cover Page pages 1.*

(Continued)

*Primary Examiner* — Andrey Belousov
*Assistant Examiner* — Erik Stitt
(74) *Attorney, Agent, or Firm* — Perkins Coie LLP (57) ABSTRACT

A representational editing system for WYSIWYG editing of editable web pages with embedded content elements. The representational editing system presents embedded content elements in an editable manner that represents their actual appearance on the web page. Typically, the representational editing system displays an image in place of the embedded content. The representational editing system enables users to modify editable attributes of embedded content in a WYSIWYG editing environment.

17 Claims, 6 Drawing Sheets

(56) References Cited

U.S. PATENT DOCUMENTS

| | | |
|---|---|---|
| 2007/0162846 A1* | 7/2007 | Cave et al. .................... 715/530 |
| 2007/0300258 A1* | 12/2007 | O'Connor et al. .............. 725/44 |
| 2008/0071929 A1* | 3/2008 | Motte et al. ................... 709/246 |
| 2008/0072164 A1 | 3/2008 | Park |
| 2008/0155411 A1* | 6/2008 | Christensen ................. 715/710 |
| 2008/0172608 A1* | 7/2008 | Patrawala et al. ............. 715/255 |
| 2008/0184100 A1* | 7/2008 | Selig ............................ 715/225 |
| 2008/0209311 A1* | 8/2008 | Agronik et al. ............... 715/234 |
| 2008/0270905 A1* | 10/2008 | Goldman ...................... 715/721 |
| 2008/0294750 A1* | 11/2008 | Kosonen ....................... 709/219 |
| 2008/0307310 A1* | 12/2008 | Segal et al. ................... 715/723 |
| 2009/0055460 A1 | 2/2009 | Hicks et al. |
| 2009/0235158 A1* | 9/2009 | Rosenstein et al. ........... 715/234 |
| 2011/0055713 A1* | 3/2011 | Gruenewald et al. ......... 715/738 |

OTHER PUBLICATIONS

Steven Holzner, Inside Javascript, Aug. 28, 2002, New Riders, The Content Editable Propery, pp. 1-2.*
Final Office Action for U.S. Appl. No. 11/842,807, Mail Date Feb. 4, 2011, 20 pages.
Hatem, "AJAX RSS Reader Step By Step Tutorial," <http://web.archive.org/web/20060318191825/http://ajax.phpmagazine.net/2005/11/ajax_rss_reader_step_by_step_t.html>, internet accessed on Jun. 15, 2010, 11 pages.
Non-Final Office Action for U.S. Appl. No. 11/842,807, Mail Date Jun. 21, 2010, 17 pages.

* cited by examiner

REPRESENTING EDITABLE ATTRIBUTES OF EMBEDDED CONTENT

BACKGROUND

Editable web pages are becoming more and more common on the Internet. An editable web page (sometimes called a wiki) is a page of a website that allows visitors of the page to easily add, remove, and otherwise edit and change available content. An editable web page enables users to write documents in a simple markup language using a web browser. Users may add links to other web pages to an editable web page. A defining characteristic of editable web page technology is the ease with which users can create and update web pages. Many edits can be made in real time, and appear almost instantaneously online. Often, there is no review before modifications are accepted. Many editable web pages are open to the public without the need to register any user account. Private editable web page servers require user authentication to edit, and sometimes even to read, editable web pages and provide greater security and authenticity to the content. The overall ease of interaction and operation makes an editable web page an effective tool for mass collaborative authoring and distribution of up-to-date information.

The manner in which users edit content varies among editable websites. Simple editable websites allow only basic text formatting, whereas editable websites that are more complex support tables, images, formulas, or even interactive elements such as polls and games. Many basic editable websites consider HyperText Markup Language (HTML) too difficult for inexperienced users to manipulate directly, and therefore only allow users to contribute plain text content to the website. This method severely limits the types of content that users can add to the website. Other intermediate editable websites have created a special language that users can use to add formatted content. For example, one convention is to treat an asterisk (*) before an item as a user request to add that item to a bulleted list. This method allows users to add more types of content, but requires that the users learn the special language and limits the users to the types of content that the language supports. More advanced editable websites allow users to edit HTML directly. Making typical HTML source code visible makes the actual text content very hard to read and edit for most users. Allowing users to edit HTML source code also allows users to add potentially malicious or inappropriate content. For example, a user can add a link that displays one target but actually navigates to another target when a viewing user selects the link. Allowing users to edit HTML directly also reduces the consistency between editable web pages that are part of the same editable website, because it is difficult to enforce any type of common format on the HTML.

Some recent wiki engines use a different method: they allow "WYSIWYG" (What You See Is What You Get) editing, usually by means of JavaScript or an ActiveX control that translates graphically entered formatting instructions, such as "bold" and "italics," into the corresponding HTML tags. These implementations generate the markup of a newly edited HTML version of the web page transparently, and shield the user from the technical details. This method provides the most formatting options to the user with the least difficulty. WYSIWYG editors work well with standard Internet content types such as text and images.

Increasingly, many users want to include content provided by other sites on the Internet to their wiki-enabled web pages. This non-editable content is referred to herein as "embedded content." Embedded content may include embedded videos, audio, polls, chat clients, calendars, slideshows, or any other type of content typically available on the Internet. For example, a user may place a video from YouTube on an editable web page. However, the user cannot actually edit the video within the editable web page. This breaks the WYSIWYG paradigm because a user is not allowed to make changes to the content directly and see a reflection of the changes in the displayed content nearly instantaneously. Embedded content elements are generally embedded via an HTML EMBED tag (e.g., embedded Flash media) or an IFRAME tag (e.g., external pages loaded into an internal frame). Neither of these tags has appropriate editing tools within typical editable browsers. However, these tags are the method by which the browsers display the embedded elements. In effect, users presently only have the option to blindly add tags to their web pages with very little control as to how the tagged content will be displayed.

Some editable websites handle embedded content by displaying a gray box when editing an embedded content element. Others may not display anything at all. When in editing mode, it is difficult for users to identify their content by viewing such a nondescript display. For example, if there are four videos on the editable web page, in editing mode they all look the same when displayed on the web page. In addition, embedded content, although not directly editable, generally has editable attributes that relate to the editable web page in which it is embedded. Editable attributes may include options to manipulate the size, position, and alignment (e.g., centering) of the content. Typical editable websites make it difficult to edit these editable attributes, and some do not allow a user to edit them at all. Such websites do not provide a familiar WYSIWYG editing environment for the user to discover which attributes are editable and to easily manipulate the embedded content.

There is a need for a system that overcomes the above problems, as well as one that provides additional benefits.

BRIEF DESCRIPTION OF THE DRAWINGS

FIG. 5b illustrates the same page when the page is displayed for editing.

The headings provided herein are for convenience only and do not necessarily affect the scope or meaning of the claimed invention.

DETAILED DESCRIPTION

Overview

A method and system for WYSIWYG editing of editable web pages with embedded content is provided, sometimes referred to herein as the "representational editing system." The representational editing system presents embedded elements in an editable manner that represents their actual appearance as opposed to the current available systems that display non-editable embedded content on an otherwise editable web page. Typically, the representational editing system displays an image in place of the embedded content.

The representational editing system enables users to easily modify editable attributes of embedded content in a WYSIWYG editing environment. The representational editing system receives a request to edit an editable web page that contains at least one editable element. For example, the editable web page may contain a video stored at another website (e.g., YouTube). The representational editing system translates the embedded element into an editable placeholder that indicates the editable attributes of the embedded element. For example, the representational editing system may translate a video into an image that contains a snapshot of the video and has the same size as the video player on the third-party website. The image snapshot makes it easy for the user to identify the embedded content represented by the placeholder. The representational editing system receives modifications to the editable placeholder from the user. For example, the user may drag the image to a new location or change the width of the image. The representational editing system applies the modifications made to the editable placeholder to the original embedded content. For example, if the user changed the size of the image, then the representational editing system may modify the size attributes of the embedded content. The representational editing system then stores the editable web page with the applied modifications. Thus, the representational editing system allows the user to both identify the embedded content when editing the editable web page and provides familiar WYSIWYG controls for modifying the editable attributes of the embedded content.

Editable web page content, HTML content, and other references to content herein can describe many different types of content associated with an editable web page. For example, editable web page content may include plain text, formatted text, graphics, videos, sound files, YouTube videos, Google Calendars, maps, PhotoBucket slideshows, links to external content hosted on other servers, or any other type of content typically available on the Internet. In some embodiments, the representational editing system provides a design or editing mode for each editable web page. For example, each web page may have an "Edit" button that, when selected, causes the web page to switch from a viewing mode to a design mode in which a user can edit the content of the web page. Upon entering the design mode, the representational editing system converts the content of the web page into a form that is easy to edit. The representational editing system may attempt to make the web page look similar in the design mode to the way it does in the viewing mode.

Aspects of the invention will now be described with respect to various embodiments. The following description provides specific details for a thorough understanding of, and enabling description for, these embodiments of the invention. However, one skilled in the art will understand that the invention may be practiced without many of these details. In other instances, well-known structures and functions have not been shown or described in detail to avoid unnecessarily obscuring the description of the embodiments of the invention.

The terminology used in the description presented herein is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this Detailed Description section.

Figure 1:
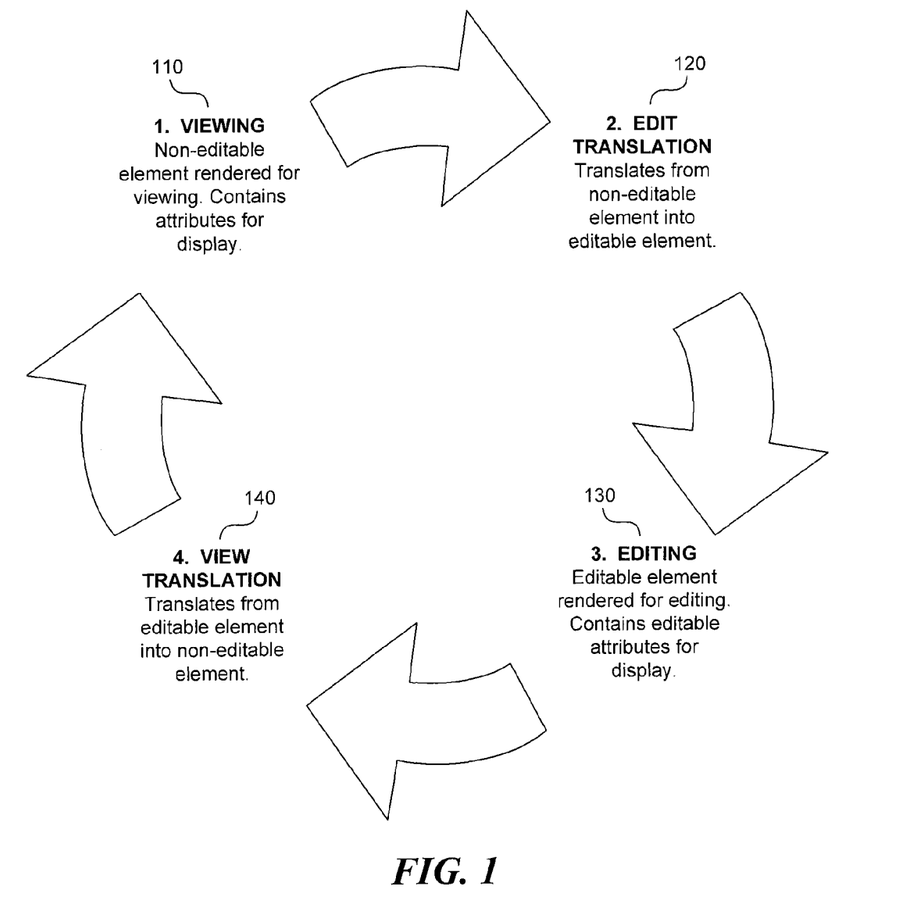
FIG. 1 is a flow diagram that illustrates the processing of a representational editing system to translate elements to and from editable elements.

FIG. 1 is a flow diagram that illustrates the processing of the representational editing system to translate elements to and from editable elements in one embodiment. In block 110, the representational editing system renders the initial editable web page with an embedded element in its default viewable state. In the viewable state, a user cannot edit the embedded element. In block 120, the representational editing system translates the embedded element into an editable element, such as an image, having size and position similar to the original embedded element. In block 130, the system displays the editable element and allows the user to manipulate it using appropriate controls on the editable web page. In block 140, the representational editing system translates the editable element back into an embedded element that cannot be edited directly, thereby preparing the element for viewing or storing for the next user to view.

Figure 2:
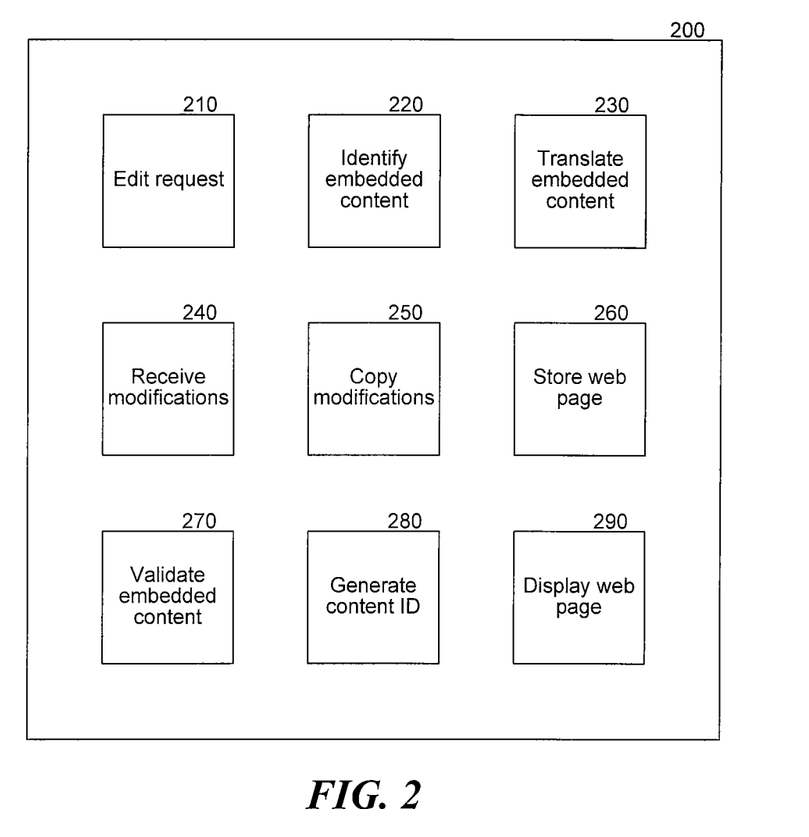
FIG. 2 is a block diagram that illustrates components of the representational editing system.

FIG. 2 is a block diagram that illustrates components of the representational editing system in one embodiment. Although client and system processing are described below, the components of the representational editing system can be distributed in various ways among clients and servers for performance, security, or other considerations. The representational editing system 200 contains an edit request component 210, an identify embedded content component 220, a translate embedded content component 230, a receive modifications component 240, a copy modifications component 250, a store web page component 260, a validate embedded content component 270, a generate content ID component 280, and a display web page component 290. The edit request component 210 receives requests to edit an editable web page from various users. The edit request component 210 may send the requesting user a different version of the web page designed for editing, if the web page contains embedded content. The identify embedded content component 220 identifies embedded content on the editable web page when a request to edit the web page is received. The translate embedded content component 230 translates identified embedded content into editable placeholders for editing. The receive modifications component 240 receives modifications to editable placeholders. For example, the user may change the size and position of an editable placeholder. The copy modifications component 250 copies changes made to the editable placeholder to the original embedded content element. The store web page component 260 stores the editable web page. The web page may be stored on a server accessible to many users, and modifications received from users may be stored in a change log associated with the web page. The validate embedded content component 270 performs validation of newly received embedded content as described further herein, such as checking the embedded content source against a white list of acceptable content sources. The generate content ID component 280 generates a unique content identifier to identify each embedded content element with the editable web page host. The display web page component 290 displays the editable web page for viewing and editing.

Aspects of the invention can be embodied in a special purpose computer or data processor that is specifically programmed, configured, or constructed to perform one or more of the computer-executable instructions explained in detail herein. Aspects of the invention can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer-implemented instructions, data structures, screen displays, and other data under aspects of the invention may be distributed over the Internet or over other networks (including wireless networks) on a propagated signal on a propagation medium (e.g., an electromagnetic wave, a sound wave, etc.) over a period of time, or they may be provided on any analog or digital network (packet switched, circuit switched, or other scheme). Those skilled in the relevant art will recognize that portions of the invention reside on a server computer, while corresponding portions reside on a client computer, such as a mobile or portable device, and thus, while certain hardware platforms are described herein, aspects of the invention are equally applicable to nodes on a network.

Client Processing

During the editing process, a user may elect to add a new embedded element to an editable web page. Often websites that provide embedded content provide HTML that a user can cut and paste into the user's website to reference the embedded content. The HTML for the embedded element contains four relevant pieces of information: the type of the HTML tag, a reference to the website providing the content for the element, an identifier uniquely defining the element, and size and positional attributes used to render the element on the web page. The first three pieces of information are not intended to be modified during the editing process, although they are maintained by the representational editing system for use in displaying the embedded content. The fourth piece of information, the size and positional attributes, is intended to be modified during the editing process. The representational editing system receives the embedded element and performs a four-step process described below.

Figure 3:
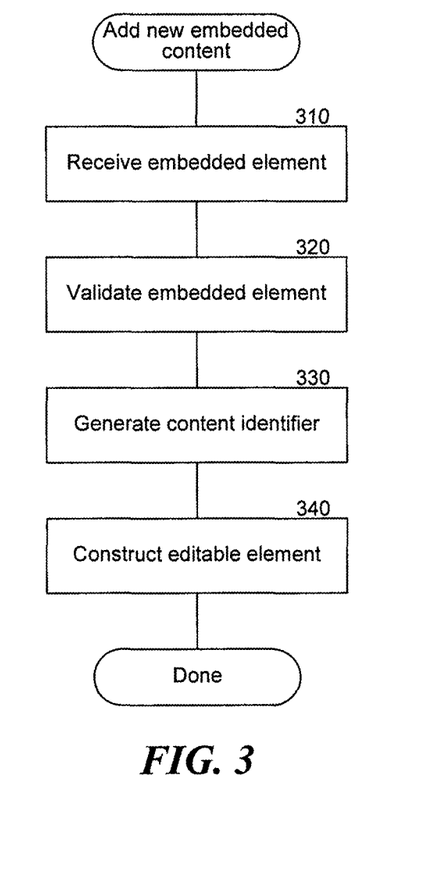
FIG. 3 is a flow diagram that illustrates a four-step process performed by the representational editing system when a new embedded element is received.

FIG. 3 is a flow diagram that illustrates the four-step process performed by the representational editing system when a new embedded element is received. In block 310, the representational editing system receives the embedded, non-editable element. For example, the embedded element may be HTML text that a user copied from the provider of the embedded content. The received embedded element contains the four pieces of information previously noted, namely the HTML tag, the providing website, the unique ID, and size and positional attributes associated with the embedded element. In block 310, the four pieces of received information are identified and separated. In block 320, the providing website is validated by the representational editing system against a white list of valid embedded content providing websites. This step is optional but can provide reassurance to the user that embedded elements are from a respected source. This step may also perform other types of validation such as automatically checking the embedded element for offensive or potentially harmful content. In block 330, the representational editing system generates a hash code that forms a unique ID for the element (e.g., in the case of some embedded Flash elements, the unique information is contained not only in parts of the "SRC" attribute, but also in a "flashvars" attribute; these two pieces of information are used to generate a single, unique ID). In block 340, the original tag name, the unique ID, and the positional information are used to construct an editable tag that represents the original element during the editing process.

During the editing process, the user may alter many of the size and positional attributes of the embedded element via graphical controls. For example, if the element is represented by an image of the embedded content (i.e., by a placeholder that takes the place of the original non-editable, embedded element), the representational editing system may display a control on the image that allows the user to resize the editable image by dragging the corners or sides of the image. Dragging can be limited to preserve a fixed aspect ratio for the image or allow a liquid aspect ratio. During the dragging process, two size attributes are modified: the "height" and the "width." In another example,.the user can use a control in the editor to change the alignment of the representative image, such that the user can center or position the image to the left or the right of other content on the editable web page. These attributes cannot be modified using the original embedded element.

When the user has finished editing an embedded element (e.g., by indicating that the user wants to save the embedded element), the representational editing system converts the editable tag associated with the modified element into an embedded tag reflecting a modified version of the original embedded element. For example, the representational editing system may convert the editable image tag that represents a video into an embedded Flash element. Metadata associated with the editable tag may contain the original tag name, the unique ID, and the size and positional attributes, so that the representational editing system can use them to construct an embedded tag for the embedded Flash element. The representational editing system may save this embedded tag or may use the tag to render the embedded content immediately on the web page.

In the case where an embedded element is pre-existing on an editable web page, such as when another user edits the web page on an editable website, the representational editing system receives the edit request and translates the embedded element into a representative editable element. For example, the web page may contain an "EasyEdit" button or other controls that, when selected, indicate a user's intention to edit the web page. Upon receiving the editing request, the representational editing system translates an embedded tag associated with the embedded element into an editable tag using a modification of the four-step process described in FIG. 3. When creating an editable element, the embedded element contains three pieces of information: the tag name, the generated unique ID, and the size and positional attributes. The embedded element does not need to be validated, since validation was performed when the element was originally added to the web page. In addition, the unique identifier has already been generated, so a new one need not be created.

Figure 4:
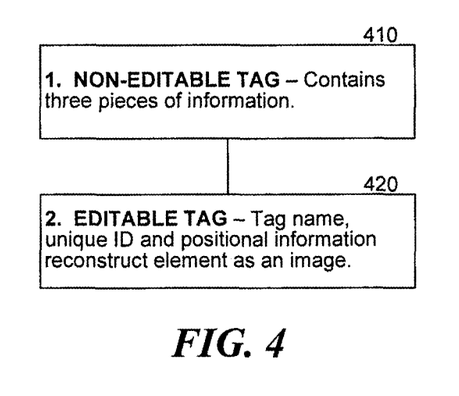
FIG. 4 is a flow diagram that illustrates a process for editing a pre-existing embedded element.

FIG. 4 is a flow diagram that illustrates a process for editing a pre-existing embedded element. The representational editing system performs a two-step process. In block 410, the representational editing system receives the non-editable, embedded tag. The three pieces of information, namely the tag name, the generated unique ID, and the size and positional attributes, are separated by the system. In block 420, the original tag name, the unique ID, and the size and positional attributes are used to construct an editable tag that represents the original element during the edit process. The user can manipulate the editable tag as described above, and changes to the editable tag are copied to the embedded tag when the web page is saved.

System Processing

As described above, in some embodiments, the system optionally receives information about the providing website for validation against a white list of known, supported providers. This white list is checked using regular expressions that compare the information provided with expected formats.

In some embodiments, the system receives information describing the embedded element and generates a hash code that serves as the unique ID for the embedded element. This unique ID is stored by the client in the editable tag during the edit process. Later, when the client requests the element from the element provider, the unique identifier may be used to proxy that request. For example, the provider of the embedded content and the identifier of the content at that provider may be stored in a database maintained by the system. The system may keep a monotonically increasing identifier to assign to each embedded element, or may use other common methods of generating a unique identifier to identify each element. When the system receives a request that specifies the unique identifier, the system can retrieve the originally referenced content or return information for the client to retrieve the content from the embedded content provider.

In some embodiments, the representational editing system uses the unique ID to proxy the data from the embedded content provider. The unique ID may represent URL information that allows the client to request the embedded element without knowledge of the element provider. The client sends the unique ID to the system, which proxies the response from the element provider back to the client. For example, a reference to "www.youtube.com/myvideo" may be changed to "www.wetpaint.com/resource/1018245" where 1018245 is the unique ID assigned to the embedded element. By placing a proxy between the client and the embedded content provider, the website hosting the editable web page can control the viewing of the content. For example, if the editable website host is informed that the content contains copyrighted or offensive material, then the editable website can remove the content by breaking the proxy or providing substitute content to display in place of the embedded content.

HTML Examples

This section provides a few examples of the HTML tags that may be used by the representational editing system during viewing and editing of an embedded content element at various stages. The stages are defined as follows:

1. Initial Embedded Tag—The initial embedded tag is entered by the user or imported from the provided website. The content in the embedded tag is represented by an HTML EMBED tag. The tag specifies a source of the content in the SRC attribute that should not be modified, and size attributes (height and width) that can be modified.

<EMBED SRC="http://www.youtube.com/myvideo" HEIGHT="150" WIDTH="150"/>

2. Editable Tag (before user modification)—The editable tag is generated by the representational editing system from the embedded tag. The example below represents the editable tag before any user modification. Here, the representational editing system has converted the link to the embedded YouTube video to a link to an image hosted by the site hosting the editable web page. The width and height of the image are initially the same as the original embedded content.

<IMG SRC="http://www.wetpaint.com/1018245" HEIGHT="150" WIDTH="150"/>

3. Editable Tag (after user modification)—The example below is the editable tag after it has been modified by the user. In this example, the user has increased the width and height of the editable placeholder and has aligned the placeholder with the right of the web page.

<IMG SRC="http://www.wetpaint.com/1018245" HEIGHT="200" WIDTH="200" ALIGN="right"/>

4. Modified Embedded Element Tag—The example embedded tag below includes all of the user modifications. The representational editing system copies the modifications to the editable attributes of the placeholder to the editable attributes of the embedded content. The embedded content will now be displayed with a larger size and right alignment when the editable web page is displayed for viewing.

<EMBED SRC="http://www.wetpaint.com/1018245" HEIGHT="200" WIDTH="200" ALIGN="right"/>

Figure 5A:
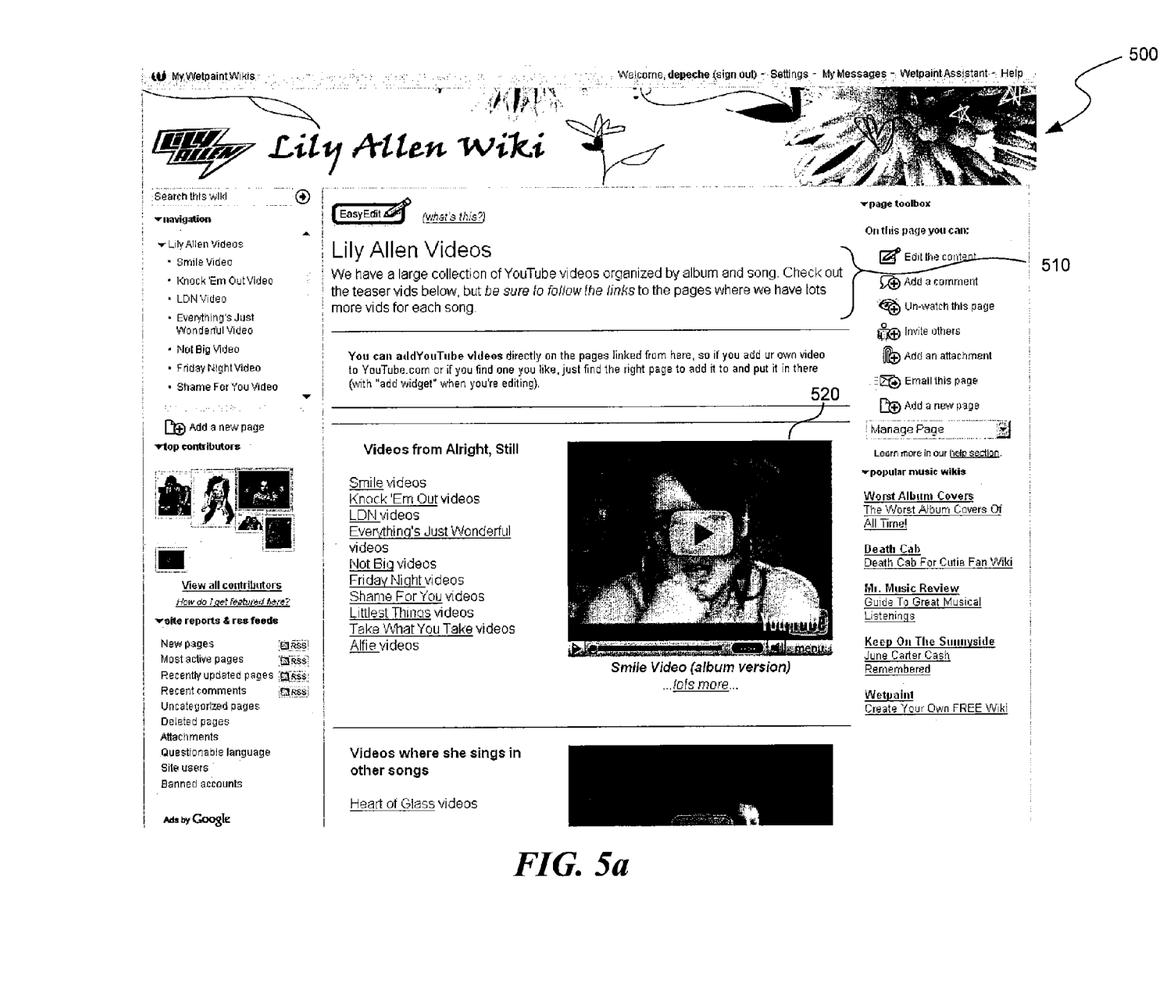
FIG. 5a illustrates a display page having embedded content when the page is displayed for viewing.

FIG. 5a illustrates a display page having embedded content when the page is displayed for viewing, and FIG. 5b illustrates the same page when the page is displayed for editing. The display page 500 contains regular content 510 and an embedded content element 520. The embedded content element 520 is a video. In FIG. 5b, the embedded content element 520 has been replaced by a placeholder 530. The placeholder 530 has a similar size and position to the embedded content element 520 and displays an identification of the content that the user will recognize (e.g., a snapshot of the video). In some embodiments, the user can modify the size and position of the placeholder using controls (not displayed) or by dragging the placeholder 530. Changes that the user makes to the placeholder 530 when editing the page will be reflected in the display of the embedded content element 520 when the page is subsequently viewed.

Conclusion

From the foregoing, it will be appreciated that specific embodiments of the representational editing system have been described herein for purposes of illustration, but that various modifications may be made without deviating from the spirit and scope of the invention. For example, although HTML has been primarily described, other languages for specifying editable content also work well with the system. Languages such as XML, RDF (often used for social networking), and RTF each can be used to provide editable content that can include generated content using the methods described above. The techniques described can also be used with many additional platforms, such as Binary Run-time Environment for Wireless (BREW), Java 2 Micro Edition (J2ME), and Java 2. Embedded content can include many varied types of content from many different sources in addition to the ones described. Accordingly, the invention is not limited except as by the appended claims.

Unless the context clearly requires otherwise, throughout the description and the claims, the words "comprise," "comprising," and the like are to be construed in an inclusive sense, as opposed to an exclusive or exhaustive sense, that is to say, in the sense of "including, but not limited to." The word "coupled," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description section using the singular or plural number may also include the plural or singular number, respectively. The word "or" in reference to a list of two or more items covers all of the following interpretations of the word: any of the items in the list, all of the items in the list, and any combination of the items in the list.

The above Detailed Description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

These and other changes can be made to the invention in light of the above Detailed Description section. While the above description details certain embodiments of the invention and describes the best mode contemplated, no matter how detailed the above appears in text, the invention can be practiced in many ways. Details of the system may vary considerably in implementation details, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

We claim:

1. A method implemented by a computer system to enable the editing of embedded content on an editable web page, the method comprising: receiving, at a computer, a request to edit an editable web page from a user, wherein the editable web page contains a non-user editable EMBED or IFRAME HTML tag that references an embedded element of dynamically generated content to be retrieved from a source that is external to the computer system that hosts the web page and that includes one or more attributes that are editable by a user and one or more attributes that are not to be edited by the user; translating, with the computer, the non-user editable EMBED or IFRAME HTML tag into an editable IMG placeholder HTML tag that is reflective of the embedded element and which includes at least one editable attribute of the embedded element and does not include the one or more attributes that are not to be edited by the user; providing, with the computer, the editable web page to the user, wherein the non-user editable EMBED or IFRAME HTML tag in the editable web page has been replaced with the editable IMG placeholder HTML tag; receiving, at the computer, modifications to one or more editable attributes indicated by the editable IMG placeholder HTML tag from the user; applying, with the computer, the modifications to the one or more editable attributes in the editable IMG placeholder HTML tag to the non-user editable EMBED or IFRAME HTML tag; and storing the editable web page with the modified non-user editable EMBED or IFRAME HTML tag.

2. The method of claim 1 wherein receiving a request to edit the editable web page comprises receiving, at the computer, a selection of an edit link when the editable web page is displayed for viewing.

3. The method of claim 1 wherein the embedded element is a video.

4. The method of claim 3 wherein the editable IMG placeholder HTML tag references an image from the video.

5. The method of claim 1 wherein the editable attribute is the size of the embedded element.

6. The method of claim 1 wherein the editable attribute is the position of the embedded element relative to other content on the editable web page.

7. The method of claim 1 wherein translating the tag comprises storing, with the computer, information pertaining to the embedded element in the editable IMG placeholder HTML tag.

8. The method of claim 1 wherein the editable IMG placeholder HTML tag indicates the editable attribute of the embedded element by displaying one or more controls for modifying the size and position of the embedded element.

9. The method of claim 1 wherein applying the modifications comprises copying, with the computer, modified attributes of the editable IMG placeholder HTML tag to corresponding attributes of the embedded element.

10. A non-transitory, computer-readable storage medium encoded with instructions for causing a computer to add embedded content to an editable web page, by a method comprising: receiving a non-user editable EMBED or IFRAME HTML tag that references an embedded content element of dynamically generated content to be retrieved from a source that is external to the computer that hosts the web page to be added to an editable web page and one or more attributes of the embedded content that can be modified by a user and one or more attributes that should not be modified by the user; constructing an editable IMG HTML tag from the received non-user editable EMBED or IFRAME HTML tag that represents the embedded content element and includes the one or more modifiable attributes of the embedded content element but does not include the one or more attributes that are not to be modified by the user; displaying the editable web page with the editable IMG HTML tag; receiving a modification to a modifiable attribute of the embedded content element; replacing the non-user editable EMBED or IFRAME HTML tag with the editable IMG HTML tag and displaying the editable web page; applying the received modification to an attribute of the embedded content element; and saving the modified attribute of the embedded content element as a non-user editable EMBED or IFRAME HTML tag reflecting the modified attribute of the embedded content element.

11. The non-transitory, computer-readable medium of claim 10 wherein the received EMBED or IFRAME HTML tag specifies a source of the embedded content element.

12. The non-transitory, computer-readable medium of claim 10 wherein the received EMBED or IFRAME HTML tag specifies a type of the content in the embedded content element.

13. The non-transitory, computer-readable medium of claim 10 including instructions for sending information describing the embedded content element to a service for validating the received embedded content element.

14. The non-transitory, computer-readable medium of claim 10 including instructions for generating a unique identifier that is stored in the modified EMBED or IFRAME HTML tag to identify a source of the embedded content element to a service that hosts the editable web page such that the service acts as a proxy for requests to retrieve the embedded content element from the external source.

15. A computer system for editing an embedded element on an editable web page, the system comprising: a processor configured to execute a sequence of program instructions that provide: an edit request component configured to receive a request to edit the editable web page containing a non-user editable EMBED or IFRAME HTML tag that references an embedded element of dynamically generated content to be retrieved from a source that is external to the computer system that hosts the web page and one or more attributes that can be edited by a user and one or more attributes that should not be edited by the user; a translate element component configured to translate the non-user editable EMBED or IFRAME HTML tag into an editable IMG HTML tag that references the embedded element and the one or more editable attributes but not the one or more attributes that should not be edited by the user; a receive modifications component configured to receive modifications to one or more of the editable attributes of the embedded element referenced by the editable IMG HTML tag; and a store web page component configured to store the editable web page and any received modifications to the editable attributes of the embedded element as the non-user editable EMBED or IFRAME HTML tag.

16. The computer system of claim 15 wherein the translate element component is configured to generate a snapshot of the content in the embedded element.

17. The computer system of claim 15 wherein the translate element component is configured to replace the embedded element with an image.

* * * * *